United States Patent
Wieczorek (12) 
(10) Patent No.: US 10,710,716 B2
(45) Date of Patent: Jul. 14, 2020

(54) INHIBITING CABLE ENTANGLEMENT IN TETHERED DRONES

(71) Applicant: T-Mobile USA, Inc., Bellevue, WA (US)

(72) Inventor: Christopher Wieczorek, Fairfax, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 226 days.

(21) Appl. No.: 15/922,800

(22) Filed: Mar. 15, 2018

(65) Prior Publication Data
US 2019/0283871 A1 Sep. 19, 2019

(51) Int. Cl.
B64C 39/02 (2006.01)
B64C 27/00 (2006.01)
B64C 27/08 (2006.01)

(52) U.S. Cl.
CPC .......... *B64C 39/024* (2013.01); *B64C 27/006* (2013.01); *B64C 27/08* (2013.01); *B64C 39/022* (2013.01); *B64C 2201/024* (2013.01); *B64C 2201/06* (2013.01); *B64C 2201/148* (2013.01)

(58) Field of Classification Search
CPC ........ B64C 2201/148; B64C 2201/143; B64C 39/022; B64C 37/02; B64F 3/02; A63H 27/04
USPC ...................................................... 244/17.17
See application file for complete search history.

(56) References Cited

U.S. PATENT DOCUMENTS

| 10,498,566 | B2* | 12/2019 | Kennedy .......... H04B 10/25754 |
| 2007/0176432 | A1* | 8/2007 | Rolt ...................... B64C 39/022 290/55 |
| 2008/0139124 | A1* | 6/2008 | Tillotson ................ H01Q 1/246 455/63.4 |
| 2013/0233964 | A1* | 9/2013 | Woodworth ........... B64D 17/80 244/2 |
| 2016/0144958 | A1 | 5/2016 | Woodworth et al. |
| 2017/0036777 | A1* | 2/2017 | Martin .................. B64C 39/024 |
| 2017/0240277 | A1 | 8/2017 | Molnar et al. |
| 2017/0350959 | A1* | 12/2017 | Yaqub ................... G01S 5/0289 |

(Continued)

FOREIGN PATENT DOCUMENTS

| CN | 205150248 U | 4/2016 |
| KR | 20130113767 A | 10/2013 |
| WO | WO-2018034578 A1 * | 2/2018 ............ B64D 47/08 |

OTHER PUBLICATIONS

International Searching Authority, International Search Report and Written Opinion, PCT Patent Application PCT/US2019/022368, dated Jun. 27, 2019, 12 pages.

*Primary Examiner* — Richard R. Green
*Assistant Examiner* — Arfan Y Sinaki
(74) *Attorney, Agent, or Firm* — Perkins Coie LLP (57) ABSTRACT

Devices for inhibiting a cable coupling drones from being entangled in the propellers of the drones, and associated systems and methods, are described herein. For example, a device can include a first weight coupled to the cable and configured to direct the cable at least partially away from the propellers of the drones. In some embodiments, the first weight can be coupled to the cable proximate to one of the coupled drones, and the device can include a second weight coupled to the cable proximate to the other of the coupled drones and configured to direct the cable at least partially away from the propellers of the drones.

20 Claims, 6 Drawing Sheets

(56) References Cited

U.S. PATENT DOCUMENTS

2019/0155312 A1\* 5/2019 Tam .................... G08G 5/0043
2019/0256207 A1\* 8/2019 Nohmi ................... B64C 19/02

\* cited by examiner

INHIBITING CABLE ENTANGLEMENT IN TETHERED DRONES

BACKGROUND

Unmanned aerial vehicles or "drones" are aircraft that may be operated without a human pilot on board—for example, controlled remotely by a human operator or autonomously by onboard computers. Some drones are lifted and propelled by one or more propellers. For example, many drones (e.g., quadcopters) include vertically oriented propellers that enable the drone to be operated above a certain geographical area for use in surveillance, product delivery, aerial photography, agriculture, recreation, scientific research, data collection, and many other applications. One drawback with conventional drones is that their load-carrying capacity and operational time (i.e., airtime or flight time) are limited by the battery life of the drone. Accordingly, there remains a need in the art for methods and systems for improving the load-carrying capacity and operational time of drones, as well as providing other benefits over existing drone technology.

DETAILED DESCRIPTION

Specific details of several embodiments of devices for inhibiting cable entanglement in tethered drones or unmanned aerial vehicles (UAVs), and associated systems and methods, are described below. In some embodiments, for example, a drone system can include first and second drones configured to hover above a geographical region and coupled together via a first cable. The drone system can include one or more weights or weighted members coupled to the first cable and configured to generally direct the first cable away from the propellers of the first drone and/or second drone to inhibit or even prevent the propellers from ingesting the first cable. In some embodiments, the weights can prevent entanglement of the first cable with the first and second drones even in turbulent environments—for example, in windy conditions.

The first drone can be tethered to a terrestrial power source and/or data source via a second cable, and the second drone can be coupled to the power source and/or data source via the first and second cables. The tethered arrangement of the first and second drones can increase the useful load of the drones and/or increase the time the drones can be operated (e.g., without running out of power). For example, the first drone can carry a Long-Term Evolution (LTE) eNode B radio configured to provide wireless communications for handsets, while the second drone can include a backhaul radio configured to establish a link with a remote backhaul transceiver. Thus, the present technology can facilitate the operation of radio-carrying drones to establish a portable and rapidly deployable cell site for providing wireless network coverage. Such cell sites could be utilized for expanding wireless network coverage and/or augmenting the capacity of a wireless network in, for example, disaster situations, undeveloped areas, or during events (e.g., concerts, sporting events, conventions, etc.).

Certain details are set forth in the following description and in FIGS. 1-5B to provide a thorough understanding of various embodiments of the present technology. In other instances, well-known components, devices, structures, materials, operations, and/or systems often associated with drones and network communication systems are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth. The phrases "in some embodiments," "according to some embodiments," "in the certain embodiments," "in the illustrated embodiment," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the present technology. Many of the details, dimensions, angles and other features shown in the Figures are merely illustrative of particular embodiments of the disclosure. Accordingly, other embodiments can have other details, dimensions, angles and features without departing from the spirit or scope of the present technology.

Figure 1:
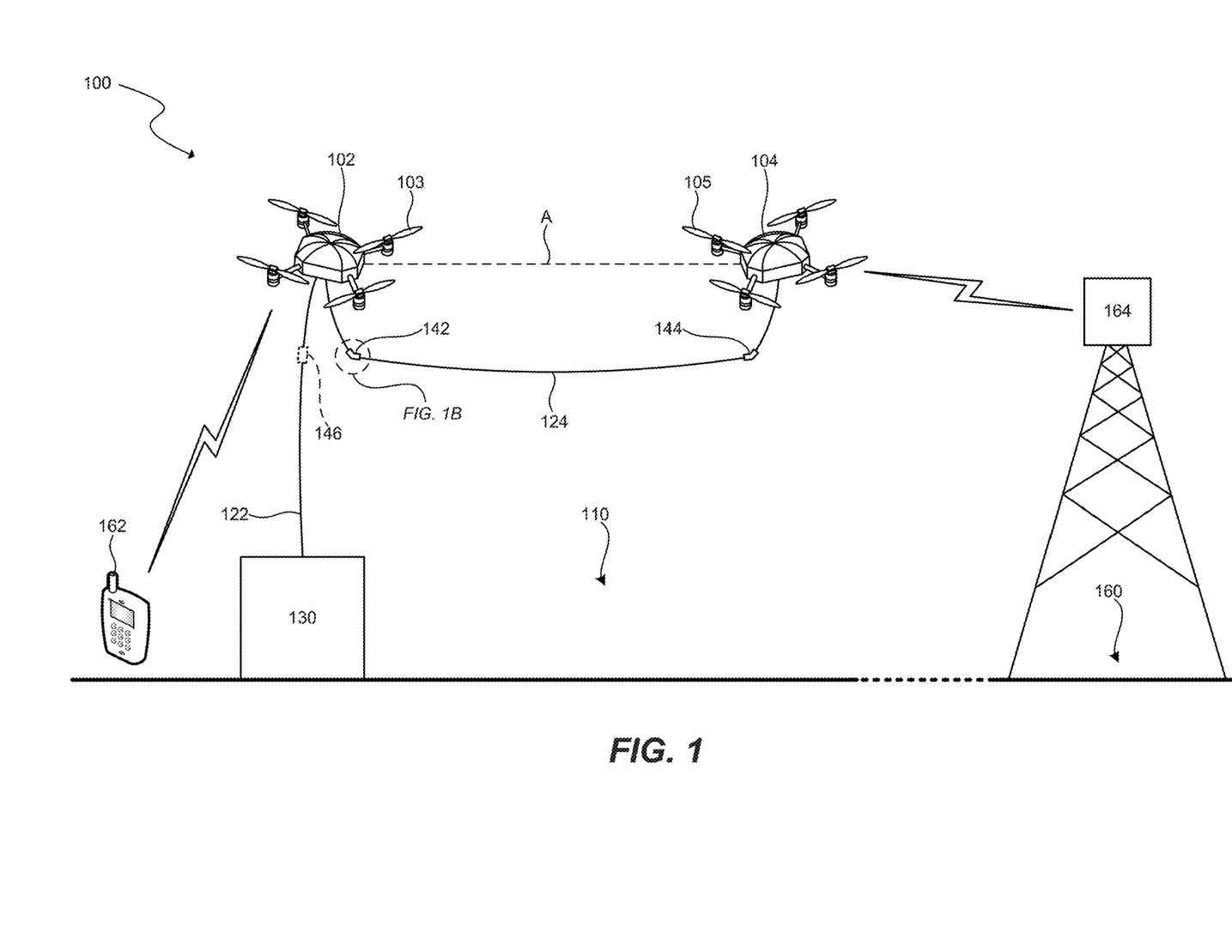
FIG. 1 is a partially schematic side view of a drone system in accordance with embodiments of the present technology.

FIG. 1 is a partially schematic side view of a drone system 100 configured in accordance with embodiments of the present technology. The system 100 includes a first drone 102 and a second drone 104 both configured to be operated above (e.g., hover above) a first geographical region 110. In the illustrated embodiment, the first and second drones 102, 104 ("drones 102, 104") are quadcopters each having four vertically oriented propellers 103 and 105 that provide lift and propulsion. In particular, the propellers 103, 105 rotate to draw air upward from below the propellers 103, 105 to provide lift. In other embodiments, the drones 102, 104 can be other types of drones such as, for example, single-propeller drones, multi-propeller drones having a number of propellers different than four (e.g., two, three, eight, etc.), fixed-wing hybrid drones (e.g., including a fixed wing and one or more propellers), etc. In some embodiments, the drones 102, 104 can be remotely controlled by an operator in (e.g., on the ground) of the first geographical region 110. In other embodiments, the drones 102, 104 can operate autonomously via one or more onboard computers.

The system 100 includes a first cable 122 extending between and coupling the first drone 102 with a terrestrial power source 130, and a second cable 124 extending between and coupling together the drones 102, 104. Alternatively or additionally, the first cable 122 (or an additional cable coupled to the first drone 102) can be coupled to a terrestrial data source. Accordingly, the second cable 124 can provide a wired power and/or data connection between the drones 102, 104. The first and second cables 122, 124 ("cables 122, 124") can be any type of cable known in the art for transmitting power and/or data to and/or from the drones 102, 104 (e.g., coaxial cables, fiber optic cables, etc.). The power source 130 can be a portable or permanent power source positioned on the ground of the first geographical region 110. In some embodiments, the power source 130 is a portable power source such as a mobile generator that is configured to be moved by a person, by an automobile, or by other suitable means of transport.

The system 100 includes an apparatus or device including a first weighted member 142 and a second weighted member 144 for inhibiting or even preventing the second cable 124 from being entangled in the propellers 103, 105 of the drones 102, 104. In particular, the first and second weighted members 142, 144 ("weighted members 142, 144") can be coupled to the second cable 124 and configured to generally direct the second cable 124 away from the propellers 103, 105. For example, the first weighted member 142 is coupled to the second cable 124 nearer to the first drone 102 than the second drone 104 and has a weight that is great enough to direct (e.g., deflect, bend, etc.) the second cable 124 generally downward (e.g., away from an axis A extending between the drones 102, 104) and away from the propellers 103 of the first drone 102. Likewise, the second weighted member 144 is coupled to the second cable 124 nearer to the second drone 104 than the first drone 102 and has a weight that is great enough to direct the second cable 124 generally downward and away from the propellers 105 of the second drone 104.

Figure 2:
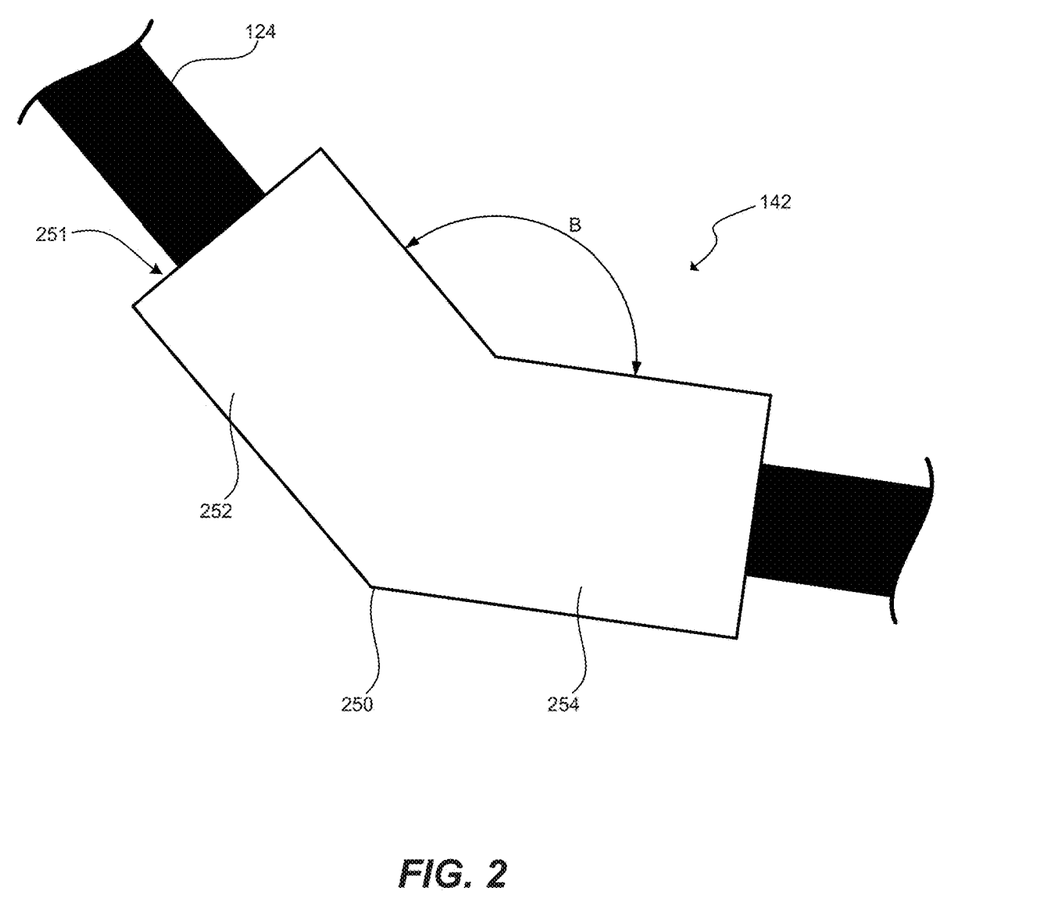
FIG. 2 is a side view of a weighted member of the drone system shown in FIG. 1 in accordance with embodiments of the present technology.

As further shown in FIG. 1, the weighted members 142, 144 can be shaped to direct the second cable 124 such that the second cable 124 extends generally parallel to the axis A between the weighted members 142, 144. More particularly, FIG. 2 is a side view of the first weighted member 142 shown in FIG. 1. In the illustrated embodiment, the first weighted member 142 has a generally angled body 250 defining a channel 251, and the second cable 124 extends through the channel 251. The body 250 can include (a) a first portion 252 shaped to direct the second cable 124 generally downward away from the propellers 103 of the first drone 102 and (b) a second portion 254 shaped to direct the second cable 124 generally toward the second weighted member 144 and generally parallel to the axis A (FIG. 1). In some embodiments, the first and second portions 252, 254 can define an angle B therebetween of greater than about 90° (e.g., greater than about 120°).

In other embodiments, the first weighted member 142 can have other shapes and/or configurations. For example, the body 250 can be linear or the angle B can be less than 180°. Moreover, in some embodiments, the first weighted member 142 can have a generally aerodynamic shape or profile that, for example, is configured to reduce the drag force on the first weighted member 142 resulting from environmental factors such as wind or rain, and/or from operation of the drones 102, 104. Wind, in particular, could propel the first weighted member 142 into the propellers 103 of the first drone 102. Increasing the weight of the first weighted member 142 would counteract the wind force but also increase the weight carried by the first drone 102, thereby reducing the useful load. Instead of increasing weight it is possible to reduce the drag or lift of the first weighted member 142 through aerodynamic shaping of the member, thereby resisting the lifting force of the wind into the propellers 103 of the first drone 102 without adding additional weight to the drone system 100.

In some embodiments, the weighted members 142, 144 are identical while, in other embodiments, the weighted members 142, 144 can have different shapes and/or weights. In some embodiments, the weighted members 142, 144 can have a weight of between about a few grams to a kilogram or two, but generally lighter in order to provide additional lifting headroom for the system 100. In general, the weight of the weighted members 142, 144 should be sufficient to provide enough downward force on the second cable 124 to avoid the cable being ingested into the propellers 103, 105 during reasonably high winds, but light enough (considering also the weight of the cables 122, 124) that the weighted members 142, 144 do not put undue weight and strain on the drones 102, 104 such that the drones have difficulty maneuvering or maintaining sufficient height.

Referring again to FIG. 1, the weighted members 142, 144 can be permanently or removably coupled to the second cable 124. For example, the weighted members 142, 144 can be integrally formed with the second cable 124, or later fastened, tightened, clamped, or otherwise secured against and/or around the second cable 124. Indeed, for some embodiments, the system 100 may include multiple weighted members of differing weights, which can be removably secured to the second cable 124 in the field or prior to use, where an appropriate weighted member is selected (e.g., via an algorithm running on an app of a mobile device) based on factors such as length/weight of the second cable 124, desired height of the drones 102, 104, average expected wind speed, weight/model of the drones 102,104, etc.

In some embodiments, the weighted members 142, 144 can be slidable or otherwise movable along the second cable 124 to permit adjustment of the general shape and positioning of the second cable 124. For example, the weighted members 142, 144 can be positioned nearer to the drones 102, 104, respectively, to permit operation of the drones 102, 104 with a greater lateral spacing (e.g., to increase the separation of the drones 102, 104 along the axis A). Similarly, the weighted members 142, 144 can be positioned farther from the drones 102, 104, respectively, to further reduce the likelihood of the second cable 124 being entangled in the propellers 103, 105 (e.g., where greater lateral spacing between the drones 102, 104 is not necessary or desirable).

In general, the weighted members 142, 144 direct the second cable 124 away from the propellers 103, 105 to reduce the likelihood of the second cable 124 becoming entangled in either or both of the propellers 103, 105. In contrast, for example, during operation of the system 100 without the weighted members 142, 144, it is possible that the second cable 124 can be drawn upward by the propellers 103, 105 and subsequently ingested by either or both of the propellers 103, 105. Likewise, environmental factors—for example, wind gusts that provide uplift to the second cable 124 and/or downdraft to the drones 102, 104—can also cause entanglement of the second cable 124 with the propellers 103, 105. Entanglement with the second cable 124 can damage the drones 102, 104 and may render them inoperable. Embodiments of the present technology, however, advantageously reduce the likelihood of propeller ingestion by weighting the second cable 124 away from the propellers 103, 105 of the tethered drones 102, 104—thereby enabling multiple drones to be tethered together without potentially destructive entanglement of the tethers with propellers of the drones.

In some embodiments, the system 100 can further include at least one third weighted member 146 (shown in phantom lines in FIG. 1) coupled to the first cable 122 and configured to inhibit the first cable 122 from being ingested by the propellers 103 of the first drone 102. In the illustrated embodiment, the third weighted member 146 has a generally linear shape. In other embodiments, the third weighted member 146 can have an angled body similar to the weighted members 142, 144 coupled to the second cable 124. Moreover, in embodiments including multiple cables tethering the first drone 102 to the ground of the first geographical region 110 (e.g., to separate power and data sources), at least one weighted member can be coupled to some or all of the cables.

In another aspect of the embodiment illustrated in FIG. 1, the system 100 can be configured as a cell site to provide wireless network coverage at least partially throughout the first geographical region 110. In particular, the first drone 102 can include (e.g., carry) a Long-Term Evolution (LTE) eNode B radio or 60 GHz radio configured to provide wireless communications for user equipment such as, for example, one or more handsets 162. The second drone 104 can include a backhaul radio configured to establish a link (e.g., a microwave backhaul link) with a backhaul transceiver 164 positioned (e.g., on a tower) at a second geographical region 160 that is remote from the first geographical region 110.

Both drones 102, 104 can hover (e.g., loiter) indefinitely or for long periods of time above the ground of the first geographical region 110 since they are powered via a wired connection—thereby replacing the need for a tower or other elevating structure at the cell site. Thus, the system 100 can function as a portable and rapidly deployable cell site for expanding wireless network coverage and/or augmenting the capacity of a wireless network. For example, the system 100 could be deployed to support sudden increases of mobile traffic and/or to expand coverage in the case of extraordinary events (trade/state/county fairs, sporting events, concerts, emergencies, catastrophic events, etc.). Similarly, the system 100 could be deployed as a temporary replacement to a permanent cell tower (e.g., as a temporary replacement for damaged equipment, during planned outages, etc.). The system (with terrestrial power supply) can all be contained in a backpack and deployed by an operator. Alternatively or additionally, the system 100 can include other components or devices carried by the drones 102, 104 or positioned elsewhere for providing services throughout the first geographical region 110, such as for visual/audiovisual coverage/surveillance, for entertainment displays, for illumination, etc. Moreover, in certain embodiments, the first drone 102 can include the backhaul radio while the second drone 104 can include the LTE eNode B radio.

Figure 3:
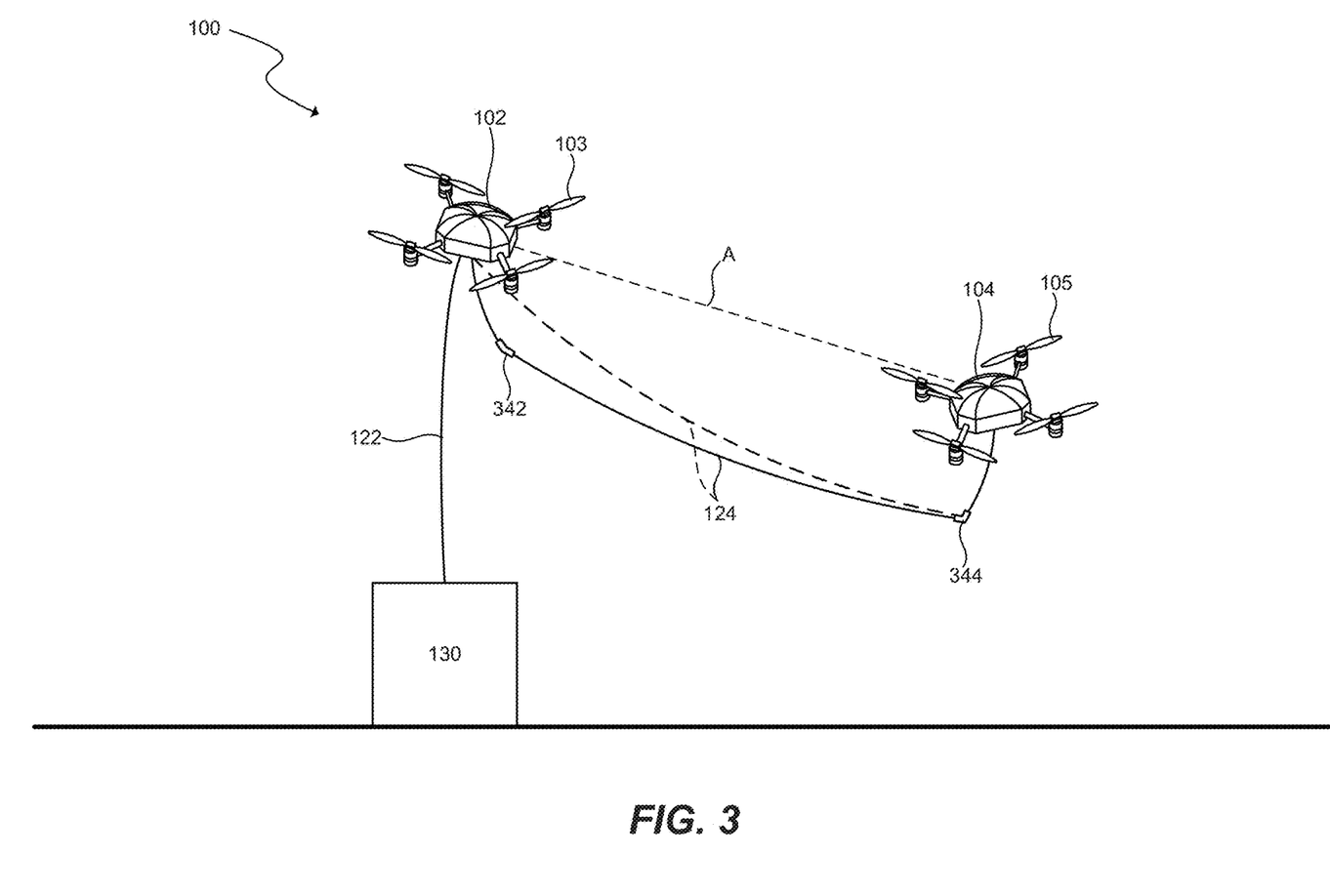
FIGS. 3 and 4 are partially schematic side views of the system shown in FIG. 1 illustrating drones hovering at different elevations in accordance with embodiments of the present technology.
Figure 4:
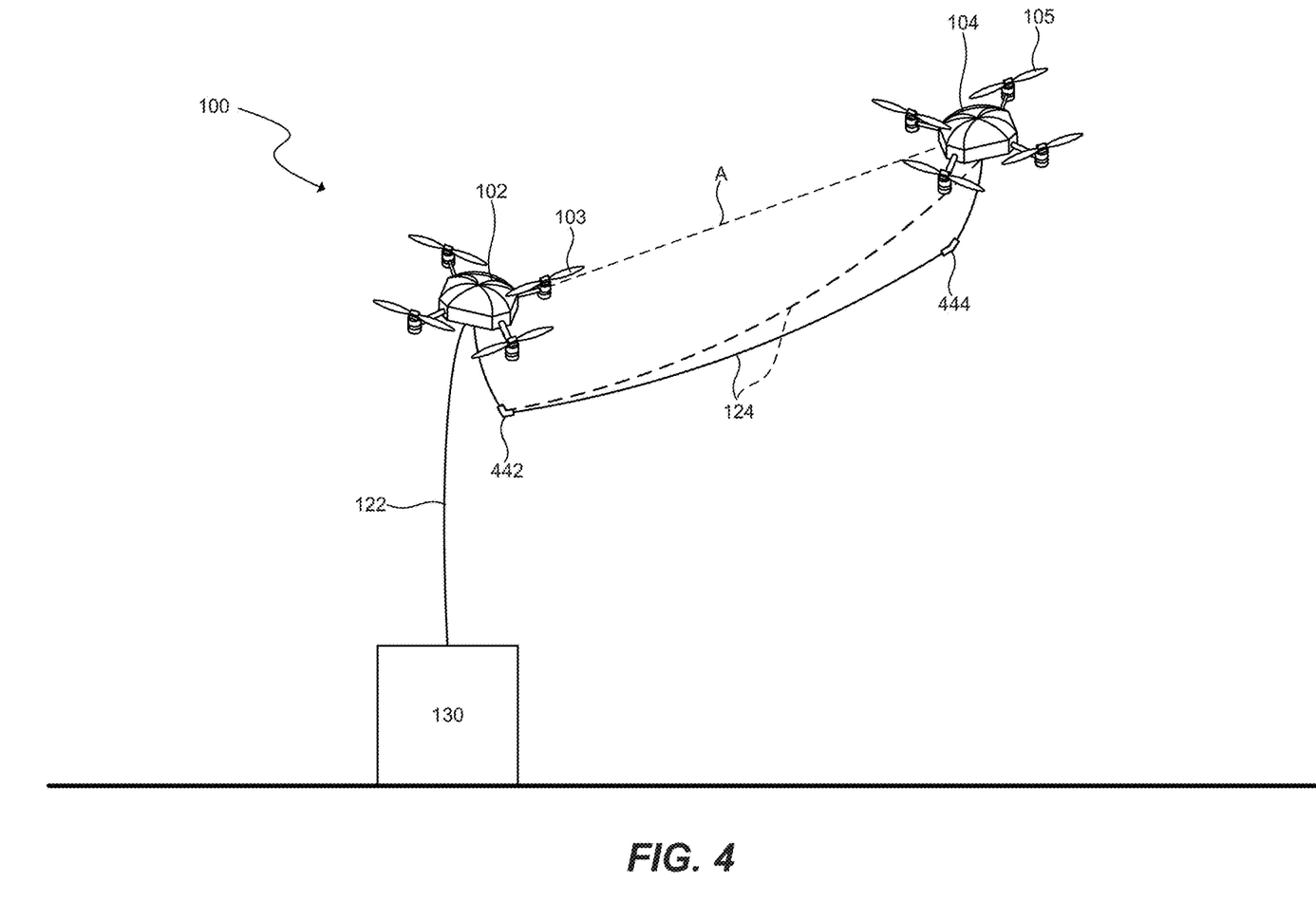

While FIG. 1 illustrates the two drones 102, 104 positioned at (e.g., hovering at) the same elevation, in other embodiments the drones 102, 104 can be positioned at different elevations. For example, FIGS. 3 and 4 are partially schematic side views of the system 100 illustrating the drones 102, 104 hovering at different elevations and including weighted members for inhibiting ingestion of the second cable 124 by the propellers 103, 105. In some embodiments, positioning the drones 102, 104 at different elevations can help reduce or even eliminate interference between radios (e.g., radios operating on different spectrum bands) or other devices carried by the drones 102, 104.

In the embodiment illustrated in FIG. 3, the first drone 102 is configured to hover at a first elevation and the second drone 104 is configured to hover at a second elevation, lower than first elevation. As shown, the system 100 includes a first weighted member 342 and a second weighted member 344 coupled to the second cable 124. The first and second weighted members 342, 344 ("weighted members 342, 344") are configured to direct the second cable 124 at least partially away from the propellers 103, 105 and can have features generally similar to features of the weighted members 142, 144, described in detail above. In the illustrated embodiment, the weighted members 342, 344 have different shapes (e.g., complementary shapes) that direct the second cable 124 (a) downward away from the propellers 103, 105 and (b) such that the second cable 124 extends generally parallel to the axis A between the drones 102, 104. For example, the first weighted member 342 can have a more linear (e.g., less-angled) shape than the second weighted member 344.

In other embodiments, the weighted members 342, 344 can have other shapes and configurations and/or the same shape as one another. In some embodiments, the system 100 can include only the second weighted member 344. In particular, because the second drone 104 is positioned below the first drone 102, the second cable 124 (as shown in phantom lines in FIG. 3) can extend generally downward away from the propellers 103 of the first drone 102 even without the first weighted member 342. That is, the first weighted member 342 may not be necessary to substantially reduce the likelihood of the second cable 124 becoming entangled in the propellers 103 of the first drone 102.

In the embodiment illustrated in FIG. 4, the first drone 102 is configured to hover at a first elevation and the second drone 104 is configured to hover at a second elevation, higher than first elevation. As shown, the system 100 includes a first weighted member 442 and a second weighted member 444 coupled to the second cable 124. The first and second weighted members 442, 444 ("weighted members 442, 444") are configured to direct the second cable 124 at least partially away from the propellers 103, 105 and can have features generally similar to features of the weighted members 342, 344, described in detail above. In the illustrated embodiment, the weighted members 442, 444 have different shapes (e.g., complementary shapes) that direct the second cable 124 (a) downward away from the propellers 103, 105 and (b) such that the second cable 124 extends generally parallel to the axis A between the drones 102, 104. For example, as shown, the second weighted member 444 can have a more linear (e.g., less-angled) shape than the first weighted member 442.

In other embodiments, the weighted members 442, 444 can have other shapes and configurations and/or the same shape as one another. The system 100 can include only the first weighted member 442. In particular, because the second drone 104 is positioned above the first drone 102, the second cable 124 (as shown in phantom lines in FIG. 4) can extend generally downward away from the propellers 105 of the second drone 104 even without the second weighted member 444. That is, the second weighted member 444 may not be necessary to substantially reduce the likelihood of the second cable 124 becoming entangled in the propellers 105 of the second drone 104.

Figure 5A:
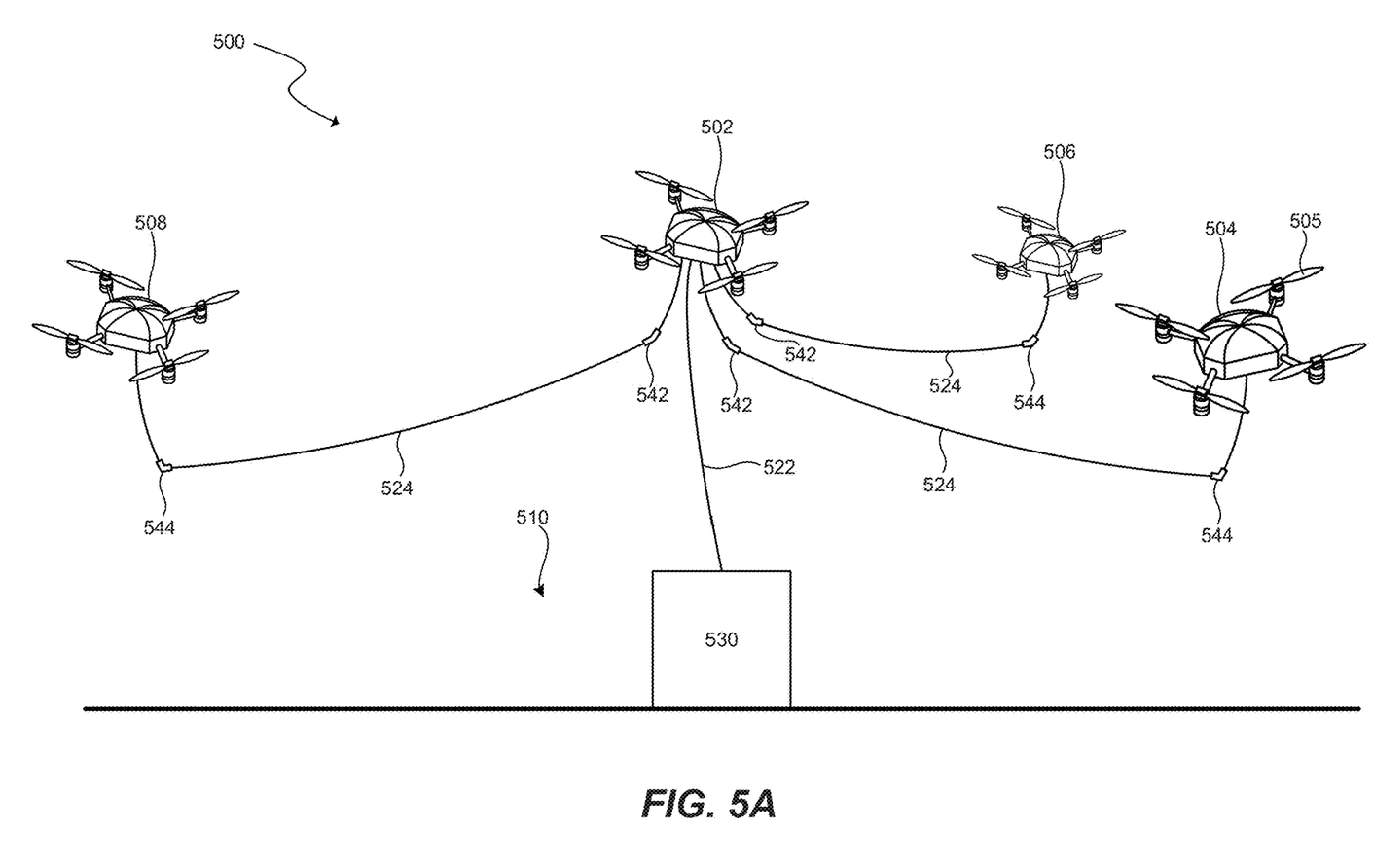
FIGS. 5A and 5B are partially schematic side and top views, respectively, of a drone system configured in accordance with another embodiment of the present technology.
Figure 5B:
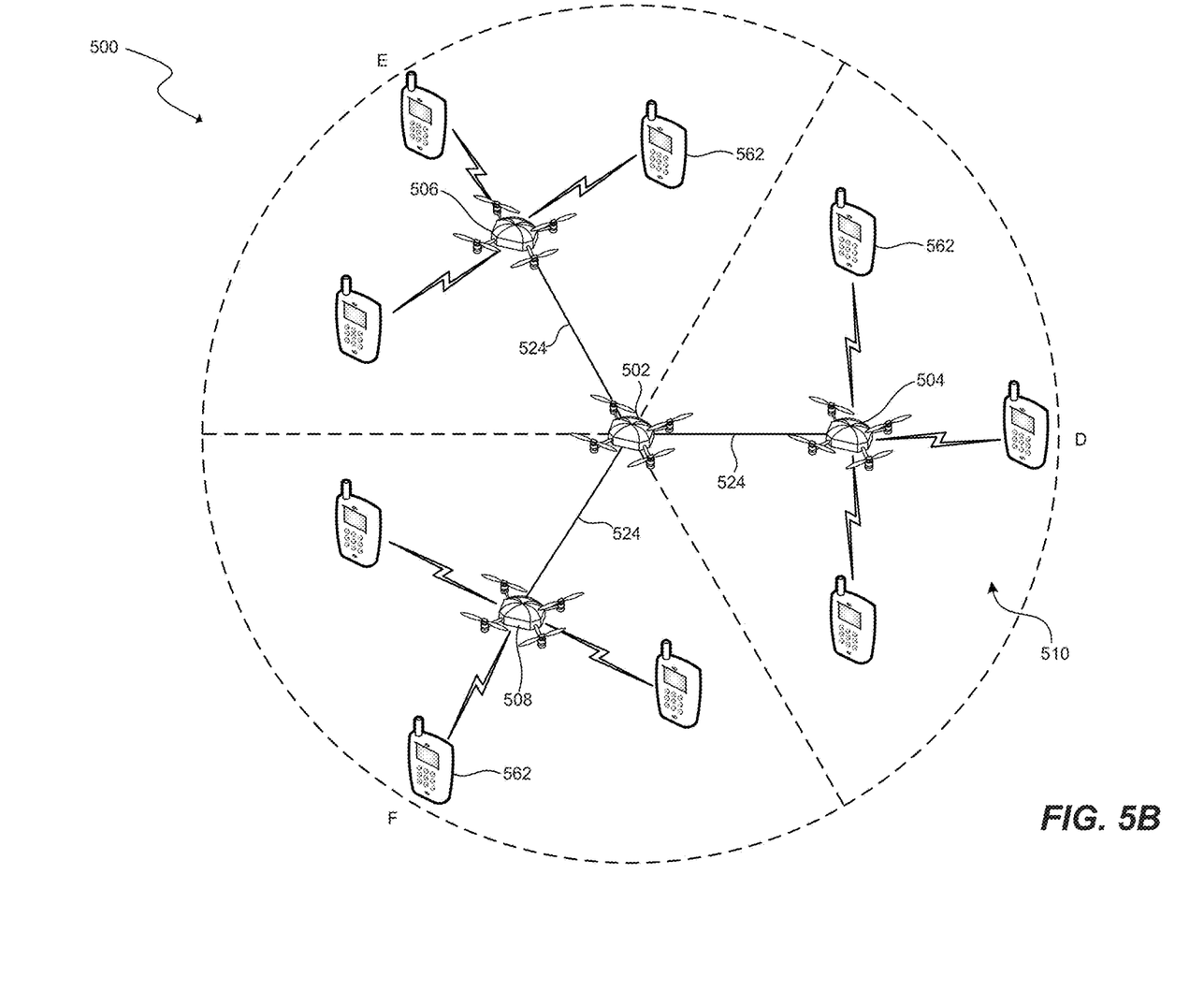

While only two tethered drones are shown in the embodiments of FIGS. 1-4, a drone system according to the present technology can include more than two tethered drones. For example, FIGS. 5A and 5B illustrate partially schematic side and top views, respectively, of a drone system 500 ("system 500") including four drones configured in accordance with embodiments of the present technology. The system 500 can include some features generally similar to the features of the system 100 described in detail above. Referring to FIG. 5A, the system includes a first drone 502, a second drone 504, a third drone 506, and a fourth drone 508 ("drones 502-508") configured to be operated above a geographical region 510. The first drone 502 is tethered to a terrestrial power source and/or data source 530 on the ground of the geographical region 510 via a first cable 522, and each of the second drone 504, third drone 506, and fourth drone 508 ("drones 504-508") is tethered to the first drone 502 via a corresponding second cable 524. A first weighted member 542 and a second weighted member 544 are coupled to each of the second cables 524 to substantially reduce the likelihood of the second cables 524 in the propellers of the drones 502-508, as described in detail above.

In the illustrated embodiment, each of the drones 504-508 is configured to hover at a lower elevation than the first drone 502. Accordingly, the first and second weighted members 542, 544 can be generally similar to, for example, the weighted members 342, 344 described in detail above with reference to FIG. 3. However, in general, the drones 502-508 can be operated at any suitable combination of elevations. For example, one or more of the drones 504-508 can be operated at (i) the same elevation as the first drone 502 (FIG. 1), (ii) at a lower elevation than the first drone 502 (FIG. 3), and/or (iii) at a greater elevation than the first drone 502 (FIG. 4). Accordingly, the weighted members 542, 544 can have any suitable configuration for deflecting the second cables 524 away from the propellers of the drones 502-508.

Referring to the top view of the system 500 illustrated in FIG. 5B, in some embodiments, the drones 504-508 can be configured to hover such that they are generally equally spaced circumferentially relative to the first drone 502 (e.g., having a "hub-and-spoke" configuration). Further, in some embodiments, the drones 504-508 can each include a LTE eNode B radio configured to provide wireless communications for user equipment such as, for example, one or more handsets 562, while the first drone 502 can include a backhaul radio configured to establish a link with a backhaul transceiver that is remote from the geographical region 510. More particularly, the LTE eNode B radio of each of the drones 504-508 can be configured to provide wireless communications to user equipment in a different sector of the geographical region 510. In the illustrated embodiment, for example, the drones 504-508 can provide wireless communications to user equipment in three different sectors D, E, and F, respectively.

In other embodiments, the system 500 can include more or fewer than the illustrated four drones and/or the drones can be configured to provide wireless communications to more or fewer sectors. In certain embodiments, the system 500 can have configurations other than hub-and-spoke. For example, multiple ones of the drones 502-508 can be tethered to the terrestrial power and/or data source 530, and/or one or more of the drones 504-508 can be further tethered to each other or to additional drones (e.g., forming a "chain" of tethered drones).

In general, in each of the embodiments described above with reference to FIGS. 1-5B, the weighted members of the present technology advantageously enable multiple drones to be tethered together without potentially destructive entanglement of the tethers with propellers of the drones, as well as providing other benefits.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:

1. A drone system, comprising:
   a first drone having at least a first propeller;
   a second drone having at least a second propeller;
   a first cable coupling the first drone to the second drone; and
   at least one weight having a bent body defining a predetermined angle and coupled to the first cable,
      wherein the at least one weight is configured to direct the first cable at least partially away from the first propeller, from the second propeller, or from both the first and second propeller.

2. The system of claim 1, further comprising a second cable coupling the first drone to a terrestrial power source, and wherein—
   the at least one weight includes a first weight coupled to the first cable proximate to the first drone and a second weight coupled to the first cable proximate to the second drone, and
   when the first and second drones hover above the terrestrial power source,
      the first weight is configured to direct the first cable (a) generally downward from the first drone and (b) generally toward the second weight, and
      the second weight is configured to direct the first cable (a) generally downward from the second drone and (b) generally toward the first weight.

3. The system of claim 1 wherein—
   the first drone includes a Long-Term Evolution (LTE) eNode B or 60 GHz radio configured to provide wireless communications for handsets, and
   the second drone includes a backhaul radio configured to establish a link with a remote backhaul transceiver.

4. The system of claim 1 wherein—
   the first cable provides a data connection, a power connection, or both the data and the power connection, between the first and second drones, and
   the at least one weight is selected based on a length of the first cable, a weight of the first cable, a desired hovering height of the first drone, a desired hovering height of the second drone, or an average expected wind speed.

5. The system of claim 1 wherein—
   the first drone carries a first radio and is configured to hover at a first elevation, and
   the second drone carries a second radio and is configured to hover at a second elevation, different than the first elevation, to reduce interference between the first and second radios.

6. The system of claim 1, further comprising a second cable coupling the first drone to a terrestrial power source,
   wherein the second drone is operatively coupled to the terrestrial power source via the first and second cables.

7. The system of claim 1, further comprising a second cable coupling the first drone to a terrestrial power source and a terrestrial data source,
   wherein the second drone is operatively coupled to the terrestrial power and data sources via the first and second cables.

8. The system of claim 1, further comprising:
   a second cable coupling the first drone to a terrestrial power source; and
   a third cable coupling the first drone to a terrestrial data source.

9. The system of claim 1, further comprising:
   a second cable coupling the first drone to a terrestrial power source, to a terrestrial data source, or to both the terrestrial power source and the terrestrial data source; and
   a second weight coupled to the second cable and configured to direct the second cable at least partially away from the first propeller.

10. The system of claim 1, further comprising:
    a second cable coupling the first drone to a terrestrial power source;
    a third drone having at least a third propeller;
    a fourth drone having at least a fourth propeller;
    a third cable coupling the third drone to the first drone;
    a fourth cable coupling the fourth drone to the first drone;
    a second weight coupled to the third cable and configured to direct the third cable at least partially away from the first propeller, from the third propeller, or from both the first and the third propeller; and
    a third weight coupled to the fourth cable and configured to direct the fourth cable at least partially away from the first propeller, from the fourth propeller, or from both the first and the fourth propeller.

11. The system of claim 10 wherein—
    the first drone includes a backhaul radio and is configured to hover generally above the terrestrial power source, and
    the second, third, and fourth drones each include a LTE eNode B or 60 GHz radio and are configured to hover about the first drone such that the second, third, and fourth drones are generally equally spaced circumferentially relative to the first drone.

12. The system of claim 10 wherein—
    the first drone includes a backhaul radio; and
    the second, third, and fourth drones each include a LTE eNode B or 60 GHz radio configured to provide wireless communications for handsets in a different sector surrounding the first drone.

13. An apparatus for use with first and second unmanned aerial vehicles (UAVs), the apparatus comprising:
  a first member having a bent body defining a predetermined angle and coupled to a cable nearer to the first UAV than the second UAV, wherein—
    the cable couples the first and second UAVs, and
    the first member is configured to generally direct the cable away from propellers of the first UAV; and
  a second member coupled to the cable nearer to the second UAV than the first UAV, wherein the second member is configured to generally direct the cable away from propellers of the second UAV,
    so that the first and second members inhibit the cable from being entangled in the propellers of the first or second UAVs.

14. The apparatus of claim 13 wherein—
  the first member has an angled body defining a first channel,
  the second member has an angled body defining a second channel, and
  the cable extends through the first and second channels, and wherein the first and second members are manually securable to the cable, and manually releasable from the cable.

15. The apparatus of claim 13 wherein—
  the first member includes (a) a first portion shaped to direct the cable generally downward away from the propellers of the first UAV and (b) a second portion shaped to direct the cable generally parallel to an axis extending between the first and second UAVs, and
  the second member includes (a) a third portion shaped to direct the cable generally downward away from the propellers of the second UAV and (b) a fourth portion shaped to direct the cable generally parallel to the axis extending between the first and second UAVs.

16. A method for operating a drone system, the method comprising:
  tethering a first drone to a power source via a first cable, wherein the first cable supplies power to the first drone;
  tethering a second drone to the first drone via a second cable extending between the first and second drones, wherein the second drone is operatively coupled to the power source via the first and second cables; and
  positioning at least one weight along the second cable to deflect the second cable away from a propeller of the first drone and/or a propeller of the second drone,
    wherein the at least one weight has a bent body defining a predetermined angle.

17. The method of claim 16 wherein positioning the at least one weight includes—
  attaching a first weight to the second cable proximate to the first drone to deflect the second cable generally downward and away from an axis extending between the first and second drones; and
  attaching a second weight to the second cable proximate to the second drone to deflect the second cable generally downward and away from the axis extending between the first and second drones.

18. The method of claim 16, further comprising:
  carrying a first radio via the first drone; and
  carrying a second radio via the second drone,
    wherein the first and second radios operate on different spectrum bands.

19. The method of claim 16, further comprising:
  carrying a first radio via the first drone; and
  carrying a second radio via the second drone,
    wherein the first radio operates on an LTE or 60 GHz spectrum band and the second radio operates on a microwave spectrum band.

20. The method of claim 16, further comprising:
  hovering the first drone at a first elevation; and
  hovering the second drone at a second elevation different than the first elevation,
  wherein positioning the at least one weight along the second cable includes positioning a single weight nearer to the one of the first or second drones hovering at a lower elevation.

* * * * *